United States Patent
Blascok et al.

(10) Patent No.: US 6,877,396 B2
(45) Date of Patent: Apr. 12, 2005

(54) GEAR SHIFT HANDLE WITH PUSH BUTTON MECHANISM FOR AN AUTOMATIC TRANSMISSION IN MOTOR VEHICLES

(75) Inventors: Bohuslav Blascok, Dassel (DE); Axel Wack, Einbeck (DE); Uwe Schlüsche, Einbeck (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 132 days.

(21) Appl. No.: 10/284,691

(22) Filed: Oct. 31, 2002

(65) Prior Publication Data

US 2003/0094066 A1 May 22, 2003

Related U.S. Application Data

(63) Continuation-in-part of application No. 09/645,278, filed on Aug. 24, 2000, now abandoned.

(30) Foreign Application Priority Data

Sep. 2, 1999 (DE) .......................................... 199 41 795

(51) Int. Cl.[7] .............................................. G05G 5/08
(52) U.S. Cl. .......................... 74/538; 74/110; 74/473.3
(58) Field of Search ............................... 74/110, 473.3, 74/537, 538; 188/290

(56) References Cited

U.S. PATENT DOCUMENTS

| 4,774,850 A | 10/1988 | Shovlin ........................ 74/475 |
| 5,125,290 A | 6/1992 | Cotter .................... 74/665 GA |
| 5,419,213 A | 5/1995 | Karlyn et al. ................. 74/437 |
| 5,575,174 A | 11/1996 | Kanematsu et al. .......... 74/475 |
| 5,617,760 A | 4/1997 | Woeste et al. ................ 74/475 |
| 5,884,530 A | 3/1999 | Sato et al. ............... 74/473.23 |
| 5,992,252 A | 11/1999 | Krajec ......................... 74/110 |

FOREIGN PATENT DOCUMENTS

| DE | 43 42 460 A1 | 6/1994 |
| DE | 44 34 135 A1 | 9/1996 |
| DE | 195 13 809 C1 | 10/1996 |

OTHER PUBLICATIONS

Patent Abstracts of Japan 07 31 7888 Pub. Aug. 1995.

*Primary Examiner*—Chong H. Kim
(74) *Attorney, Agent, or Firm*—Cohen, Pontani, Lieberman & Pavane

(57) ABSTRACT

A shift handle with a push button mechanism for shifting an automatic transmission in motor vehicles which includes the shaft handle, a push rod for the automatic transmission, the push button and elements for transmitting movement from the push button to the push rod. The push button is provided with a toothed rack engaging in the teeth of a toothed wheel which is mounted in the shift handle so as to be rotatable by a cylindrical pin. A tension spring is arranged in the push button. The push rod has a region with teeth engaging in the toothed wheel which is mounted so as to be rotatable.

14 Claims, 2 Drawing Sheets

GEAR SHIFT HANDLE WITH PUSH BUTTON MECHANISM FOR AN AUTOMATIC TRANSMISSION IN MOTOR VEHICLES

This application is a Continuation-in-Part of U.S. patent application Ser. No. 09/645,278, filed Aug. 24, 2000 now abandoned, which claims priority from Applications filed in Germany on Sep. 2, 1999, No. 199 41 795.4.

BACKGROUND OF THE INVENTION

1. Field of the Invention

The invention relates to a gear shift handle with a push button mechanism.

The invention is applicable for gear shift handles for actuating a gear shift lever for an automatic transmission in motor vehicles in which it is required to deflect the movement of the button of the shift lever and transmit it to an axially movable push rod by means of a transmission element.

2. Description of the Prior Art

In motor vehicles with an automatic transmission, a gear shift handle or selector handle by which the desired gear is adjusted is generally arranged on a control panel or console in the motor vehicle. In order to carry out the shifting or selection process, a button is arranged in the shift handle. The driver of the motor vehicle presses this button into the shaft handle with his fingers, which causes a blocking rod to be moved so that it is possible to shift from one gear to another gear. For this purpose, a locking rod is located in the shift lever. However, when the button projects horizontally in the shift handle, the axial movement of the button must be transmitted or deflected to the axial transmission mechanism arranged in the shift lever. According to Patent Abstracts of Japan CD-ROM, JP 07317888 A, sloping surfaces at the end of the button or locking rod which deflect or transmit the force from the button to the tie rod by 90° due to the inclined planes are used for this purpose. This is disadvantageous in that there are parts which are subject to wear and which must be replaced or serviced, require a certain installation space and cannot be disassembled in every selection position without damaging the locking rod.

German reference DE 195 13 809 C1 discloses a shift lever for an automatic transmission in a motor vehicle with a locking rod which is guided therein so as to be movable axially. The locking rod is constructed as a push rod with a toothed rack toothing which cooperates with a swivelable toothed segment in the shift handle. The axial movement of the push button transverse to the shift lever is transmitted to the toothed segment in an articulated manner by way of a peg or trunnion. This device comprises a large number of parts which are complicated to assemble.

SUMMARY OF THE INVENTION

Therefore, it is the object of the present invention to provide a shift handle with a push button mechanism for actuating a locking rod in the shift lever for an automatic transmission which enables simple assembly and disassembly and in which there occurs little wear.

The shift handle with push button mechanism according to the invention essentially comprises the push button in the shift handle, this push button being provided with a toothed rack.

It is advantageous to arrange the toothed rack in the interior of the push button in the inside, upper area. The teeth of the toothed rack engage in a first row of teeth of a toothed wheel which is arranged in the shift handle so as to be rotatable by means of a cylindrical pin.

The toothed wheel has an adjacent second row of teeth which engages in a toothed rack toothing of the locking rod that is fixedly connected with the push rod. In this way, the path traveled by the push button when pressed in is deflected via the toothed wheel to the push rod so that shifting can take place.

A tension spring is advantageously arranged inside the push button. This tension spring can be attached by one end to the push button and by the other end to the cylindrical pin that is fixed in the automatic shift handle.

In order that the toothed rack of the push button can be pressed sufficiently far into the shift handle, it must cross the path of the toothing of the push rod. In order to make this possible in a simple manner, it is advantageous that the toothing of the push rod has a corresponding recess.

Further, the toothed wheel is advantageously formed so that it is not provided with teeth over its entire curvature, but only to the extent necessary for movement. The remaining portion of the circumference should be constructed in such a way that it acts as a stop relative to the housing.

Further, all moving parts of the shift handle are advantageously made of plastic.

The invention has the advantage that only relatively little wear occurs at the moving parts of the shift handle and assembly can be carried out quickly and simply.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
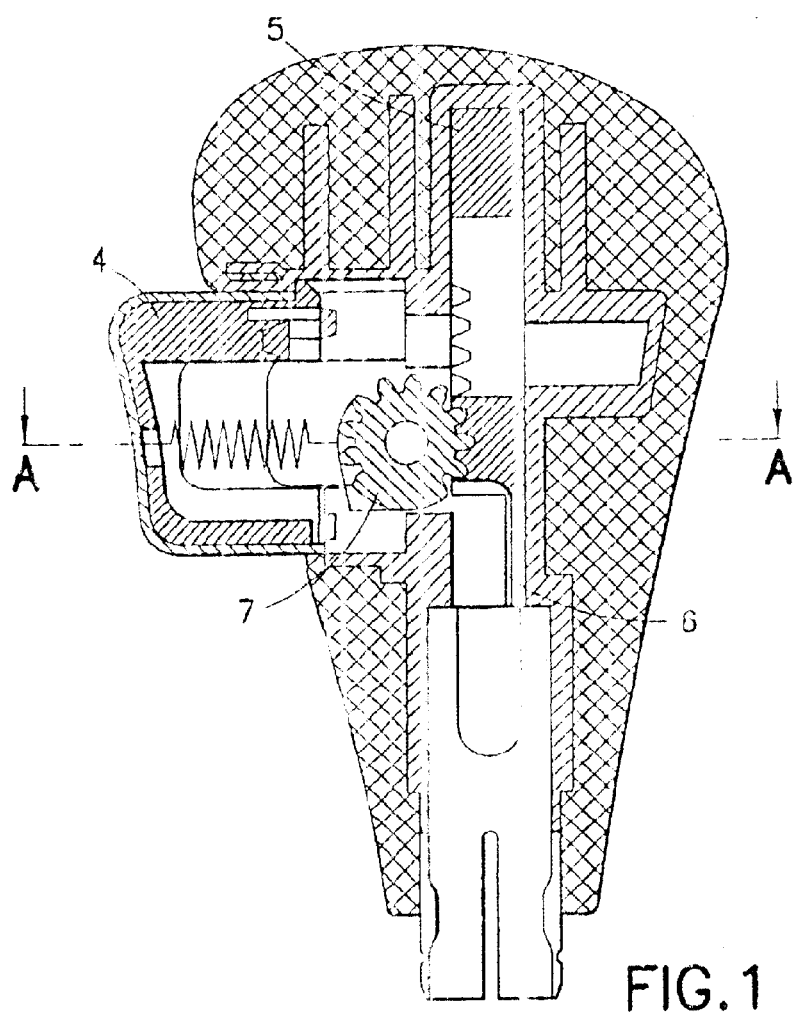
FIG. 1 shows a partial longitudinal section through the shift handle according to the invention.
Figure 2:
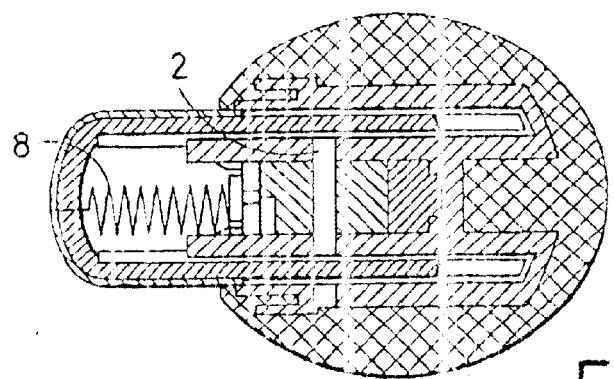
FIG. 2 shows a section A—A of FIG. 1.
Figure 3:
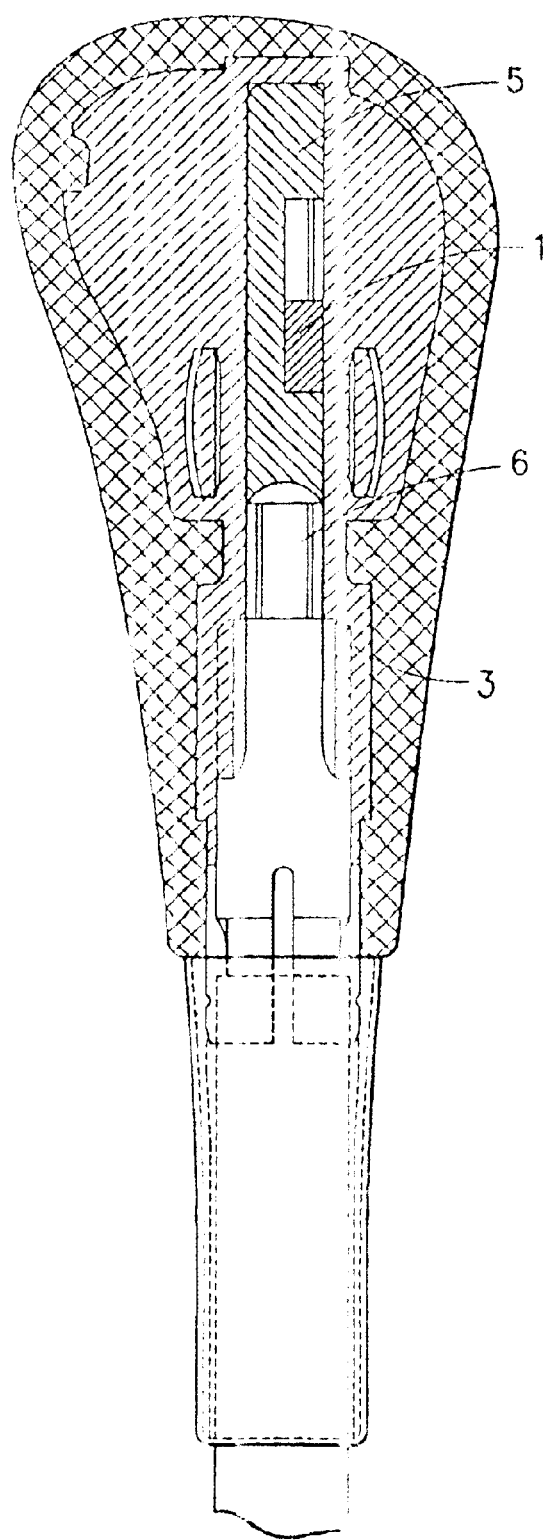
FIG. 3 shows a cross section through the shift handle according to the invention.

FIG. 1 shows a longitudinal section through the most important parts of the shift handle according to the invention. The shift handle has a main body 10. A push button 4 having a toothed rack 1 engaging a toothed wheel 7 is movable axially in the body 10 transverse to the shift lever. The toothed wheel 7 is arranged on a cylindrical pin 2 so as to be rotatable relative to the main body and engages in the toothing of the push rod 6 so as to transmit the axial movement of the push button 4 to the push rod 6. The push button 4 is connected with the cylindrical pin 2 by means of a tension spring 8, as is shown in FIG. 2. The toothed wheel 7 can be divided and provided with different teeth. The toothed wheel 7 is not provided with teeth over its entire circumference but acts simultaneously to limit movement by means of stops in its lower portion 7' (FIG. 1). FIG. 3 shows a cross section through the shift handle according to the invention. The toothed rack 1 of the push button 4 can be seen in the recess 15 of the push rod 6 in the region of the toothing. The end 5 of the push rod 6 without teeth abuts at the upper end of a core insert 3. All moving parts are manufactured from plastic.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. The shift handle mountable on a shift lever, the shift handle comprising:
   a body;
   toothed wheel mounted for rotation on a cylinder pin in the body, the toothed wheel having first and second rows of circumferential teeth;
   a push button which is movable axially in the body relative to the shift lever, the push button having a toothed rack whose teeth engage the first row of circumferential teeth of the toothed wheel;
   a tension spring arranged in the push button and having one end attached to the push button and another end attached to the cylindrical pin; and
   a locking rod constructed as a push rod which is movable axially in the shift lever, the push rod having a toothed rack whose teeth engage the second row of teeth of the toothed wheel, whereby axial movement of the push button actuates the locking rod.

2. The shift handle according to claim 1, wherein push rod has a recess adjacent to the toothed rack of the push rod, the toothed rack of the push button being movable through the recess.

3. The shift handle according to claim 1, wherein the toothed rack of the push button is arranged in an inside, upper region of the push button.

4. The shift handle according to claim 1, wherein the toothed wheel is provided with teeth over only part of the toothed wheel circumference, and has stops in rows of the teeth so as to limit movement of the toothed wheel.

5. The shift handle according to claim 1, wherein the toothed rack, the push button, the push rod and the toothed wheel are made of plastic.

6. A shift handle mountable on a shift lever, the shift handle comprising:
   a body;
   a toothed wheel mounted for rotation on a cylinder pin in the body, the toothed wheel having first and second rows of circumferential teeth;
   a push button which is movable axially in the body relative to the shift lever, the push button having a toothed rack whose teeth engage the first row of circumferential teeth of the toothed wheel;
   a tension spring arranged in the push button between the push button and the cylindrical pin; and
   a locking rod constructed as a push rod which is movable axially in the shift lever, the push rod having a toothed rack whose teeth engage the second row of teeth of the toothed wheel, wherein push rod has a recess adjacent to the toothed rack of the push rod, the toothed rack of the push button being movable through the recess, whereby axial movement of the push button actuates the locking rod.

7. The shift handle according to claim 1, wherein the toothed rack of the push button is arranged in an inside, upper region of the push button.

8. The shift handle according to claim 1, wherein the toothed wheel is provided with teeth over only part of the toothed wheel circumference, and has stops in rows of the teeth so as to limit movement of the toothed wheel.

9. The shift handle according to claim 1, wherein the toothed rack, the push button, the push rod and the toothed wheel are made of plastic.

10. A shift handle mountable on a shift lever, said shift handle comprising:
    a body;
    a toothed wheel mounted for rotation on a cylinder pin in the body, the toothed wheel having first and second rows of circumferential teeth;
    a push button which is movable axially in the body relative to the shift lever, the push button having a toothed rack whose teeth engage the first row of circumferential teeth of the toothed wheel, wherein the toothed rack of the push button is arranged in an inside, upper region of the push button;
    a tension spring arranged in the push button and arranged between the push button and the cylindrical pin; and
    a locking rod constructed as a push rod which is movable axially in the shift lever, the push rod having a toothed rack whose teeth engage the second row of teeth of the toothed wheel, whereby axial movement of the push button actuates the locking rod.

11. The shift handle according to claim 10, wherein the toothed wheel is provided with teeth over only part of the toothed wheel circumference, and has stops in rows of the teeth so as to limit movement of the toothed wheel.

12. The shift handle according to claim 10, wherein the toothed rack, the push button, the push rod and the toothed wheel are made of plastic.

13. A shift handle mountable on a shift lever, the shift handle comprising:
    a body;
    a toothed wheel mounted for rotation on a cylinder pin in the body, the toothed wheel having first and second rows of circumferential teeth which extend over only part of the toothed wheel circumference, the toothed wheel having stops which limit rotation of the toothed wheel;
    a push button which is movable axially in the body relative to the shift lever, the push button having a toothed rack whose teeth engage the first row of circumferential teeth of the toothed wheel;
    a tension spring arranged in the push button between the push button and the cylindrical pin; and
    a locking rod constructed as a push rod which is movable axially in the shift lever, the push rod having a toothed rack whose teeth engage the second row of teeth of the toothed wheel, whereby axial movement of the push button actuates the locking rod.

14. The shift handle according to claim 13, wherein the toothed rack, the push button, the push rod and the toothed wheel are made of plastic.

* * * * *